(12) United States Patent
Baek et al.

(10) Patent No.: US 9,036,180 B2
(45) Date of Patent: May 19, 2015

(54) APPARATUS AND METHOD FOR SECURING CONFIDENTIAL INFORMATION OF PRINTED DOCUMENT IN CLOUD COMPUTING ENVIRONMENT

(71) Applicants: Intellectual Discovery Co., Ltd., Seoul (KR); Kings Information & Network Co., Ltd., Hanam-si, Gyeonggi-do (KR)

(72) Inventors: Jong Kyung Baek, Hanam-si (KR); Myung Sik Moon, Hanam-si (KR)

(73) Assignees: INTELLECTUAL DISCOVERY CO., LTD., Seoul (KR); KINGS INFORMATION & NETWORK CO., LTD., Gyeonggi-do (KR)

( * ) Notice: Subject to any disclaimer, the term of this patent is extended or adjusted under 35 U.S.C. 154(b) by 0 days.

(21) Appl. No.: 14/265,835

(22) Filed: Apr. 30, 2014

(65) Prior Publication Data
US 2014/0320888 A1   Oct. 30, 2014

(30) Foreign Application Priority Data

Apr. 30, 2013 (KR) .......................... 10-2013-0048335

(51) Int. Cl.
*G06F 3/12* (2006.01)
*G06F 21/60* (2013.01)

(52) U.S. Cl.
CPC ............ *G06F 3/1222* (2013.01); *G06F 3/1238* (2013.01); *G06F 3/1288* (2013.01); *G06F 21/608* (2013.01)

(58) Field of Classification Search
USPC ........................ 358/1.13, 1.14, 1.15; 715/757
See application file for complete search history.

(56) References Cited

U.S. PATENT DOCUMENTS

| 2011/0096174 | A1* | 4/2011 | King et al. ................. 348/207.1 |
| 2013/0111045 | A1* | 5/2013 | Ichikawa ...................... 709/228 |
| 2014/0280961 | A1* | 9/2014 | Martinez et al. ............. 709/226 |
| 2014/0283010 | A1* | 9/2014 | Rutkowski et al. ............. 726/18 |

FOREIGN PATENT DOCUMENTS

KR     10-1213984     12/2012

* cited by examiner

*Primary Examiner* — Allen H Nguyen
(74) *Attorney, Agent, or Firm* — Rothwell, Figg, Ernst & Manbeck, P.C.

(57) ABSTRACT

The present invention provides a client terminal for receiving a cloud computing service from a cloud server that provides the cloud computing service. The client terminal includes a character string information extractor configured to extract character string information from document data requested to print in a printer that is connected to the client terminal, a confidential information detector configured to detect confidential information from the extracted character string information and a controller configured to prohibit printing of the document data including the character string of the detected confidential information or to mask at least one or more characters of the character string of the detected confidential information, with predetermined specific characters.

20 Claims, 8 Drawing Sheets

[JUMIN]
count=7
jumin1=#####-#####
jumin2=#####-#####
jumin3=##########
jumin4=##### #####
jumin5=#####-#####
jumin6=# # # # # #-# # # # #
jumin7=# # # # # - # # # # #

[CARD]
count=3
card1=####-####-####-####
card2=#### #### #### ####
card3=################

[ENTERPRISE]
count=3
enterprise1=###-##-#####
enterprise2=#########
enterprise3=# # #-# #-# # # # #

FIG.7

FIG.8

APPARATUS AND METHOD FOR SECURING CONFIDENTIAL INFORMATION OF PRINTED DOCUMENT IN CLOUD COMPUTING ENVIRONMENT

RELATED APPLICATIONS

This application claims the benefit of Korean Patent Application No. 10-2013-0048335, filed on Apr. 30, 2013, which is hereby incorporated by reference as if fully set forth herein.

FIELD OF THE INVENTION

The present invention relates to an apparatus for securing confidential information of printed documents in a cloud computing environment and the method thereof. More specifically, the present invention relates to an apparatus and method for securing confidential information of printed documents in a cloud computing environment, capable of effectively securing confidential information of documents printed in a printer directly/indirectly connected to a client terminal in a cloud computing environment in which the client terminal is connected a cloud server over a wired/wireless communication network.

BACKGROUND OF THE INVENTION

With the development of an information-oriented society, generally, the economic value of information is highly estimated, and it is becoming normal to collect and use personal information throughout our society.

Recently, cases that personal information is leaked out and violated increase steadily, and cases that confidential information and personal information of customers are leaked out increase in companies. Further, there are illegal use of other's name and phone scam, causing mental and financial damages to individuals.

In order to prevent the above problems, companies construct integrated security solutions such as DRM (Digital Right Management), DLP (Data Loss Prevention), ECM (Enterprise Contents Management), etc. Security on printed documents also continues to be performed, and method for the security includes a printed document control, text log, original log, and so on.

A method for the printed document control generally includes a control method using a print processor and a control method using a virtual print.

First, in the control method using a print processor, a printout is controlled by sensing a print task during the procedure in which the print task spooled in a print spooler is transferred to a printer apparatus from a hard disk HD.

Second, in the control method using a virtual printer, a printout is controlled by sensing a print task of all applications, upon performing a printing, installed in a computer using print control modules built in each user's computer.

In such two control methods, it is possible to know the printout information provided. However, functions to detect and protect the personal information included in printed documents are not being studied yet.

Meanwhile, in the text log method for a printed document, information on a printed document is extracted using the aforementioned printed document control method and the log is generated. The overall printout situation can be managed through printout information by transmitting the log to a central management server to be managed. Although it is possible to identify the name, date, output PC, and so on of the printed document using the log information, it is not possible to identify whether personal information is included in the document.

Further, in the original log method for a printed document, a user generates a copy image for a printed document through the print control method when the print task is performed and transmits it to a central management server so as to be managed. The original image is used as an image to identify whether what print task has been performed on the printed document by the user. However, the original image is prepared in a pictorial file format so that it is not possible to detect personal information.

As such, the security method in the art does not identify the personal information so as to control the personal information. In the method for generating text log or original log, it does not identify personal information when printing and can determine whether there is personal information through a log after printing.

That is, in the above mentioned security methods in the art, there is a high possibility that personal information is leaked out when printed documents including personal information is exposed out in public. Especially, when personal history, certificate license and diploma issued based on personal information and company's confidential documents were leaked out, it is necessary to prepare the measures to protect them.

Meanwhile, a recent computing environment is evolving toward a cloud computing architecture in which services are provided utilizing overall computing resources on a network when required by each terminal. A cloud computing service may be defined as 'on demand outsourcing service of computing resource' over an information communication network such as the Internet.

In the cloud computing environment, a service provider combines several data centers dispersed using a virtualization technology and provides services needed by users. A service user uses necessary computing resources such as application, storage, operation system, and security by not installing them in each user's own terminal. Rather, the service user selectively uses services on a virtual space generated by the virtualization technology at the user's desired time and as much as the user likes. The user pays for based on the amount of use of computing resources, instead of purchasing each computing resource.

According to the cloud computing service, there are advantages that users have access to a cloud network using a terminal capable of performing network access and basic arithmetic functions and then perform tasks requiring mass storage and high performance computing resource, and are also provided with enhanced services.

However, in case of downloading contents using the cloud computing service and outputting them, problems may come up when the output is secret or confidential documents of a company, not general documents.

For example, when an inside authorizer has access to cloud computing service of the company and outputs confidential documents with malicious intent, it is not possible to control the above problems in the existing system.

SUMMARY OF THE INVENTION

In view of the above, the present invention provides a client terminal for effectively securing confidential informant printed in a printer directly/indirectly connected to the client terminal in a cloud computing environment in which the client terminal has access to a cloud server over wired/wireless communication network and a method thereof.

In accordance with an aspect of embodiments of the present invention, there is provided a client terminal for receiving a cloud computing service from a cloud server that provides the cloud computing service and the client terminal includes a character string information extractor configured to extract character string information from document data requested to print in a printer that is connected to the client terminal, a confidential information detector configured to detect confidential information from the extracted character string information and a controller configured to prohibit printing of the document data including the character string of the detected confidential information or to mask at least one or more characters of the character string of the detected confidential information, with predetermined specific characters.

Further, the character string information extractor is configured to extract character string information from the document data before the document data requested to print in the printer that is connected to the client terminal is transformed into a pictorial format.

Further, the character string information extractor is configured to extract the character string information from the document data based on printing start/end information for the document data.

Further, the printing start/end information is obtained using an AIP (Application Programming Interface) hooking.

Further, the confidential information detector is configured to compare the character string information extracted with at least one preset confidential information pattern data, thereby detecting confidential information.

Further, in case that the number of the detected confidential information is more than a predetermined reference value, the controller is configured to mask at least one or more characters of a character string of the detected confidential information with a predetermined specific character.

Further, the controller is configured to prohibit printing of the document data in case that the number of the detected confidential information is more than a predetermined reference value.

Further, the character string information extractor is configured to process the document data in a unit of page after extracting the character string information, and the confidential information detector is configured to compare the processed document data with the at least one preset confidential information pattern data, thereby detecting the confidential information.

Further, the character string information extractor is configured to generate first hash information for a file downloaded through the cloud computing service of the cloud server, and the confidential information detector is configured to generate second hash information for the document data, and in case that there is hash information identical to the second hash information in the generated first hash information, compare the processed document data with the at least one preset confidential information pattern data, thereby detecting confidential information.

Further, the confidential information detector is configured to detect confidential information from the processed document data by the character string information extractor and then perform a checksum, thereby minimizing data errors.

In accordance with another aspect of embodiments of the present invention, there is provided a method for securing confidential information of documents printed using a printer connected to a client terminal in a cloud computing environment in which the client terminal having a character string information extractor, a confidential information detector and a controller is connected to a cloud server over a wired/wireless communication network and the method includes extracting character string information from document data requested to print in the printer connected to the client terminal, detecting confidential information from the extracted character string information and controlling to prohibit printing of the document data including the character string of the confidential information detected or to mask at least one or more characters of the character string of the detected confidential information with a predetermined specific character.

Further, the extracting character string information includes extracting character string information from the document data before the document data requested to print in the printer connected to the client terminal is transformed into a pictorial format.

Further, the extracting character string information includes extracting the character string information from the document data based on printing start/end information for the document data.

Further, the printing start/end information is obtained using an AIP (Application Programming Interface) hooking.

Further, the detecting confidential information includes comparing the extracted character string information with at least one preset confidential information pattern data, thereby detecting confidential information.

Further, in case that the number of the confidential information detected is more than a predetermined reference value, the controlling includes masking at least one or more characters of the character string of the detected confidential information with a predetermined specific character.

Further, the controlling includes blocking printing of the document data in case that the number of the detected confidential information is more than a predetermined reference value.

Further, the extracting character string information includes processing the document data in a unit of page after extracting the character string information, and the detecting confidential information includes comparing the processed document data with the at least one preset confidential information pattern data, thereby detecting the confidential information.

Further, the extracting character string information includes generating first hash information for a file downloaded through the cloud computing services of the cloud server, and the detecting confidential information includes generating second hash information for the document data, and in case that there is hash information identical to the second hash information in the first hash information generated, comparing the document data processed with the at least one preset confidential information pattern data, thereby detecting confidential information.

Further, the detecting confidential information includes detecting confidential information from the document data produced by processing the character string information extractor and then performing a checksum, thereby minimizing data errors.

According to the present invention, it is possible to secure confidential information of documents printed in a printer connected directly/indirectly to a client terminal in a cloud computing environment in which the client terminal is connected to a cloud server over a wired/wireless communication network.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims. Similar reference numerals refer to the same or similar elements throughout the drawings. The term "and/or" used herein includes all combinations of each of the items and one or more of them described herein.

Although the terms "a first", "a second", and the like are used herein to describe a variety of elements, components and/or sections, it is understood that these elements, components and/or sections are not limited by these terms. The use of the terms is intended to distinguish the elements, components or sections from other elements, components or sections. Thus, it is understood that a first element, a first component or a first section mentioned below may be a second element, a second component, or a second section within the spirit of the present invention, as well.

It should be noted that the terminologies used herein is merely intended to describe the embodiments and do not limit the scope of the present invention.) In the present application, the representation of the singular, unless it clearly indicates in the phrase otherwise, includes multiple representations. In the present application, it should be understood that the terms "includes" or "comprises" and/or "including" or "comprising", and variants thereof are used to specify the presence of other components, steps, operations, and/or elements mentioned herein, but are not intended to exclude the possibility of the presence or supplement of one or more other components, steps, operations, and/or elements.

Unless there is another definition, all terms (including technical and scientific terminologies) as used herein may be used as meaning that may be commonly understood by those having ordinary skill in the art. Further, unless specifically defined clearly, terms that are defined in advance commonly used are not to be construed ideally or excessively.

Further, in the following description, well-known functions or constitutions will not be described in detail if they would obscure the subject matter of the present disclosure in unnecessary detail. Further, the terminologies to be described below are defined in consideration of functions in the present disclosure and may vary depending on the intentions or practices of a user or an operator. Accordingly, the definition may be made on the basis of the content throughout the specification.

First, a technology called cloud computing means an Internet-based (cloud) computing technology. The cloud computing has a hidden complex infrastructure as if the Internet is expressed as a cloud in a computer network topology and has a computing style by which IT-related functions are provided as a service style. A user can make use of the services provided from the cloud computing by using the Internet.

In addition, the cloud computing is a technology which employs the combination of the concept of various computing, such as virtualized computing, utility computing, on-demand computing and the like and a communication technology, implements one virtual computer or service by integrating multiple data centers typically made up of a large number of computers using a virtualization technology, and provides a variety of software, security solutions and computing power to a user accessing thereto through on-demand service.

In other words, the cloud computing calls 'an on-demand outsourcing service of IT resources over the Internet' that enables a user to perform his/her desired task in the way of storing programs or documents that were otherwise stored individually in a personal computer or a server of a company in an Internet-based virtual server or storage and running a cloud application such as a web browser or the like using various terminals inclusive of a personal computer.

In this case, the users may selectively pick and use the computing resources such as a cloud application, storage, OS, security, and the like at a user's desired time and as much as the users want and pay for based on the amount of use of computing resources. Although a full-fledged cloud computing has not yet made, researches on a cloud computing service, service platform and virtual technology are actively ongoing under the leadership of the large companies such as including Google, Microsoft and IBM.

And, the term 'secreting information' as used throughout the embodiments of the present invention, may include personal-related information (for example, a social security number, telephone number, mobile phone number, e-mail address, driver's license number, personal card number of information about individuals, personal account number, etc.) as well as company-related information (for example, corporation number, business registration number, corporate card number, corporation account number, etc.), which may generally mean any information to be protected from individuals and companies.

On the other hand, the typical printing process between a terminal such as a computer and a printer directly or indirectly connected to the computer will be described as follows.

First, the process by the client terminal will be explained as follows. Upon receiving a printing instruction from the exterior, the client terminal creates document information including the name of a document to be printed, start and end of the document, and start and end of pages; records the created document information on the header of packet data; and transmit it to the printer.

In response thereto, the client terminal extracts the document information including a document name, start and end of the document, and start and end of pages; creates new document information such as the name of a document to be printed, total page, page number being printed based on the extracted document information; transforms the document information to a language recognizable by the printer; and outputs the transformed document information to the print through a spooling process.

The process of creating the document information such as the name of a document to be printed, total page and page number being printed will be described in terms of a printing architecture in detail as follows.

In an application program of a document processor installed in the client terminal, in case where the document name is transferred as a parameter when StartDoc( ) function is called from GDI (Graphics Device Interface) function (for example, GDI32.DLL), the GDI transfers the document name to a printer driver while calling a function, e.g., a DrvStartDoc( ) function (in case of Windows NT).

The printer driver transforms the document's name into the format that is recognizable by a PDL (Printer Description Language) translation program and stores it in a spooler.

Whenever each page starts in the application program, a StartPage( ) function is called from the GDI function. In this case, the GDI calls a function corresponding to the Start Page( ) function, for example, a DrvStartPage( ) in case of Windows NT, of the printer driver. Whenever the aforementioned function is called, the printer driver counts the page number, transforms the counted page number into the format that is recognizable by the PDL translation program, and stores it in the spooler.

When the application program calls EndDoc( ) function from the GDI function, the printer driver calculates a total page of the document through the number of the counted pages until now, transforms the total page into the format that is recognizable by the PDL translation program, and stores it in the spooler.

Meanwhile, the process by the printer will be described as follows. The printer receives the new document information from the client terminal and displays the name of the document currently being printed, total page number, page number being printed, name of the document in a queue to be printed, and total page number on an LCD panel.

In other words, the printer extracts data corresponding to the document's name, total page number, page number being printed from PDL data received from the client terminal and transforms the extracted data into an image to be printed through the use of the PDL translation program. A print controller then sends the transformed image to a print engine so as to print the document.

As described above, in the typical printing process between the client terminal and the printer, the document processor records the data in a DC (Device Context) in the form of a picture using GDI32.DLL when printing it. At this time, a character string is changed to a pictorial file format.

Based on the foregoing description, the embodiment of the present invention is mainly characterized by extracting character string information of the document data that is requested to print based on printing start/end information using an API (Application Programming Interface) hooking technique before the character string of the document data that is requested to print is changed to the pictorial file format.

Figure 1:
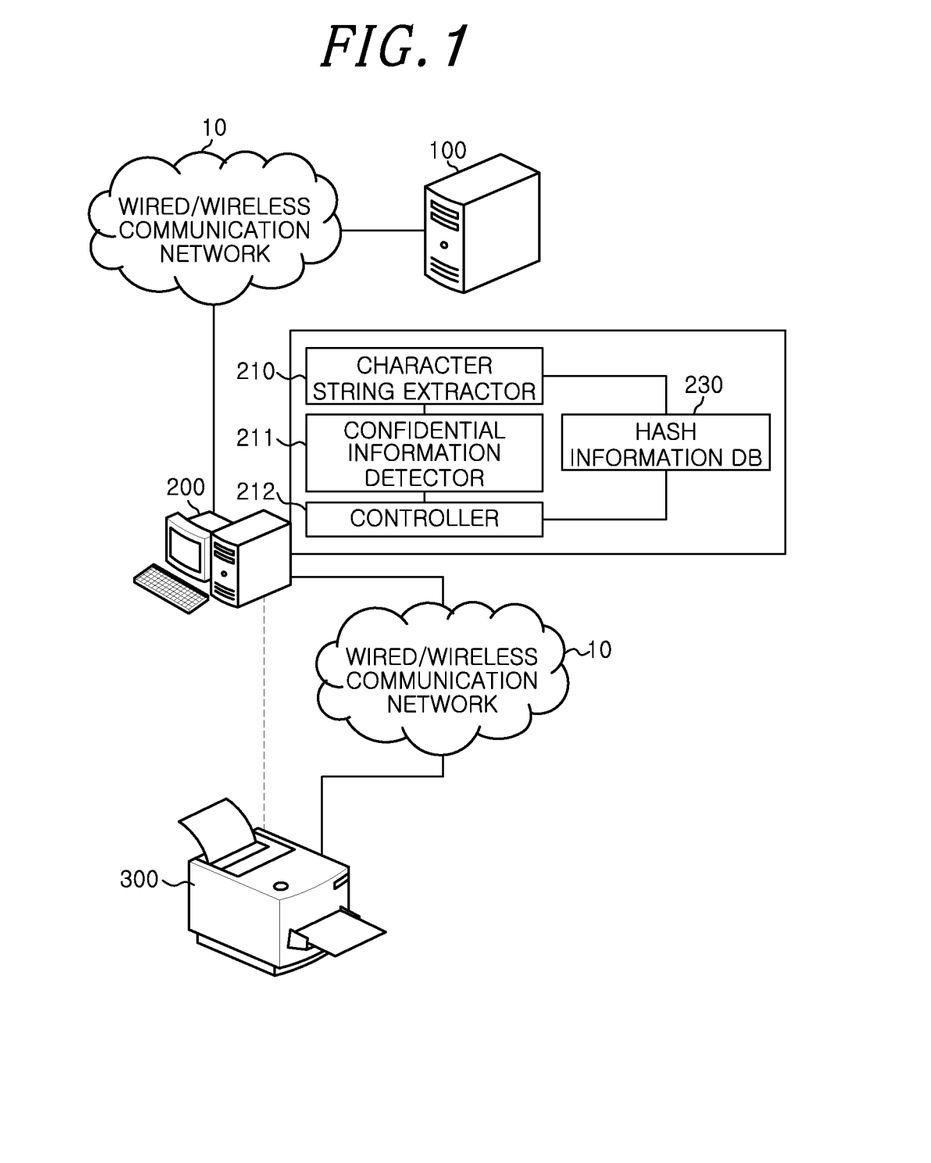
FIG. 1 is an overall block diagram conceptually illustrating a security system for confidential information of printed documents in a cloud computing environment in accordance with an embodiment of the present invention.
Figure 2:
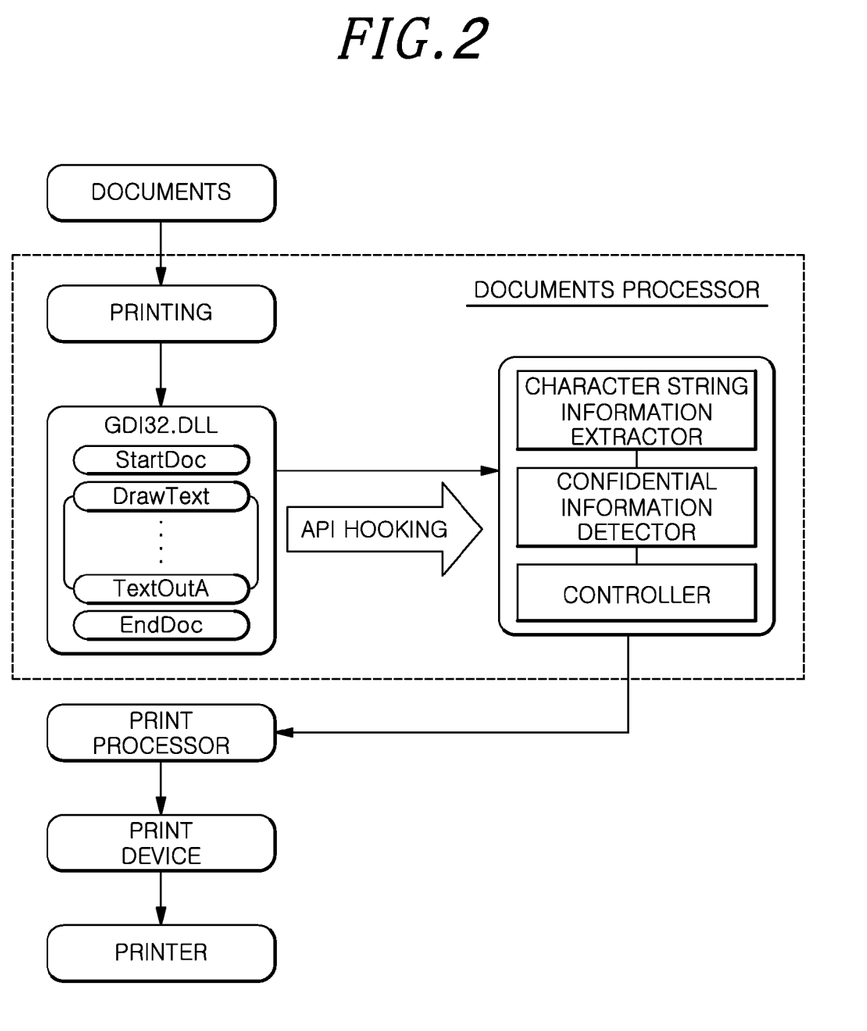
FIG. 2 is a conceptual diagram illustrating a procedure for extracting character string information from document data requested to print using a document processor of a client terminal applied in an embodiment of the present invention and controlling the document processor.

FIG. 1 is an overall block diagram that conceptually illustrates a security system for confidential information of printed documents in a cloud computing environment in accordance with an embodiment of the present invention, and FIG. 2 is a conceptual diagram illustrating a process for extracting character string information from document data requested to print using a document processor of a client terminal applied in an embodiment of the present invention and controlling the document processor.

Referring to FIGS. 1 and 2, a security system of confidential information of printed documents in a cloud computing environment in accordance with an embodiment of the present invention serves as a system for securing the confidential information of documents printed using a printer directly/indirectly connected to a client terminal in a cloud computing environment. The security system largely includes a cloud server 100, and a client terminal 200 and a printer 300 that are connected to the cloud server 100 over wired/wireless communication network 10.

Here, the cloud server 100 performs a function to provide a cloud computing service in response to a request from the client terminal 200.

In other words, the cloud server 100 is responsible for providing the cloud computing service to the client terminal 200 and providing computing resources requested from the client terminal 200 over the wired/wireless network 10 with the client terminal. The cloud server 100 also provides a computing service that allows the client terminal 200 to use any of devices requested by the client terminal.

The cloud server 100 thus includes a plurality of storages that stores file received from a business operator (a content provider) which provides a large amount of data, for example, such as an application program file, game program file, text data file, document file, picture file, music file, video file, bar code file, etc.

Meanwhile, the wired/wireless network 10 may be a wired/wireless network or the Internet. The Internet may refer to a global open computer network architecture that provides TCP/IP protocol and several services on the upper layer, i.e., HTTP (Hyper Text Transfer Protocol), Telnet, FPT (File Transfer Protocol), DNS (Domain Name System), SMTP (Simple Mail Transfer Protocol), SNMP (Simple Network Management Protocol), NFS (Network File Service), NIS (Network Information Service), and the like and provides environments that enable the client terminal 100 to access the cloud server 100 and/or the printer 300. The Internet may be the wired or wireless Internet, or a core network integrated with a wired public network, wireless mobile communication network or the mobile Internet.

The client terminal 200 may be typically a personal computer (PC), for example, a desktop PC, notebook PC, or the like, but is not limited thereto, and may be any type of wired/wireless communication device capable of accessing the cloud server 100 and/or the printer 300 over the wired/wireless network 10 to receive the cloud computing service and printing various document data.

For example, the client terminal 200 may mean any wired/wireless terminal having a user interface for accessing to the cloud server 100 and/or the printer 300 and Windows OS installed therein, such as a Palm PC (Personal Computer), personal digital assistant (PDA), smart phone, WAP phone (wireless application protocol phone), mobile gaming machine (e.g., mobile play-station) that can communicate with the cloud server 100 and/or the printer 300 over the wired/wireless network 10.

The client terminal 200 includes a character string information extractor 210, a confidential information detector 211, a controller 212, and a hash information DB 230, which are the main components to secure confidential information of printed documents in a cloud computing environment.

The character string information extractor 210 performs functions to generate hash information for a file downloaded through a cloud computing service of the cloud server 100, to make them as a table, and to store them in the hash information DB 230.

Further, the character string information extractor 210 performs functions of monitoring document data requested to print using a document processor of the client terminal 200 through an API (Application Programming Interface), generating hash information for document data requested to print, extracting character string information based on printing start/end information, and processing the document data in a unit of the page.

In other words, the character string information extractor 210 calls a printout related GDI32.DLL file of the document processor included in the client terminal 200 using the API hooking, monitors a StartDoc( ) and EndDoc( ) functions indicating printing start/end in real time, and extracts character string information using at least one character string related function of character string related functions (for example, DrawTextA( ) DrawTextW( ) DrawTextExA( ) DrawTextExW( ) ExtTextOutA( ) ExtTextOutW( ) TextOutA( ) TextOutW( ) PolyTextOut( ) TabbedTextOut( ) and so on), thereby extracting character string information of the document data requested to print.

Further, it is preferred that the character string information extractor 210 stores the processed document data as a file and transfers it to the confidential information detector 211.

In case that there is hash information identical to the hash information for the document data requested to print in the hash information DB 230, the confidential information detector 211 performs a function to compare the document data processed by the character string information extractor 210 with at least one preset confidential information pattern data, thereby detecting confidential information.

The controller 212 performs a function to control the document processor of the client terminal 200 so as to analyze the type and number of the detected confidential information and to block or secure the document data requested to print according to a predetermined security policy.

The confidential information detector 211 also detects the confidential information from the document data processed by the character string information extractor 210 and perform a checksum, thereby minimizing data errors.

Preferably, the controller 212 may control the document processor of the client terminal 200 to block printing of the document data requested to print, according to the predetermined security policy in case that the number of the confidential information detected is more than a predetermined reference value, and to mask some characters (for example, #, * and so on) of the character string of the confidential information with predetermined specific characters in case that the number of the confidential information detected is less than the predetermined reference value, thereby securing the confidential information.

Meanwhile, it is preferred that the confidential information includes at least one of an identification number, telephone number, card number, corporate registration number, business registration number, account number, e-mail address, passport number, mobile phone number, or driver's license number.

The hash information DB 230 performs functions to store and manage the hash information for files generated by the character string information extractor 210 by making it as a table. The hash information DB 230 is preferably included in the client terminal 200, but it is not limited thereto. The hash information DB 230 may be substituted with a memory included in the terminal 200 or may be embodied by a separate database DB server or storage medium.

Hereinafter, a detailed description will be given to a method for securing confidential information of documents printed using a printer directly/indirectly connected to a client terminal in a cloud computing environment in accordance with an embodiment of the present invention.

Figure 3:
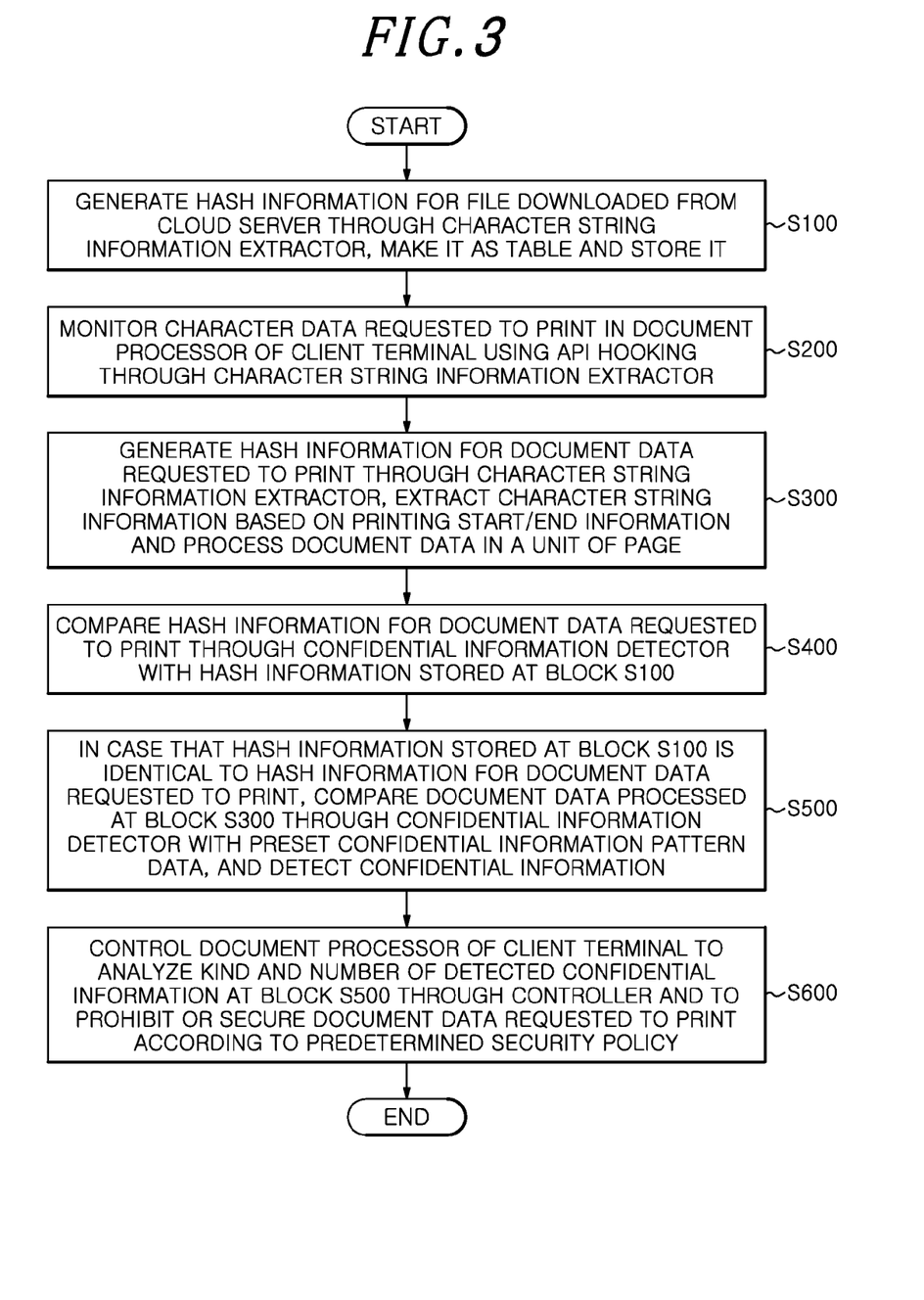
FIG. 3 is an overall flowchart illustrating a method of securing confidential information of printed documents in a cloud computing environment in accordance with an embodiment of the present invention.

FIG. 3 is an overall flow chart illustrating a method of securing confidential information of printed documents in a cloud computing environment in accordance with an embodiment of the present invention.

Referring to FIGS. 1 to 3, first, in case that there is a file downloaded from the cloud server 100 through a character string information extractor 210 included in a client terminal 200, hash information for the file is generated and then made as a table, thereby being stored in a hash information DB 230 at Block S100.

Next, when a printing request is received from a document processor included in the client terminal 200, the character string information extractor 210 applied in an embodiment of the present invention is switched to a monitoring mode in order to detect a character string.

In other words, the character string information extractor 210 monitors the character data requested to print in the document processor of the client terminal 200 in real time using an API (Application Programming Interface) hooking at Block S200.

Subsequently, the character string information extractor 210 generates hash information for the document data requested to print, extracts character string information based on printing start/end information, and then processes the document data in a unit of page at Block S300.

Figure 4:
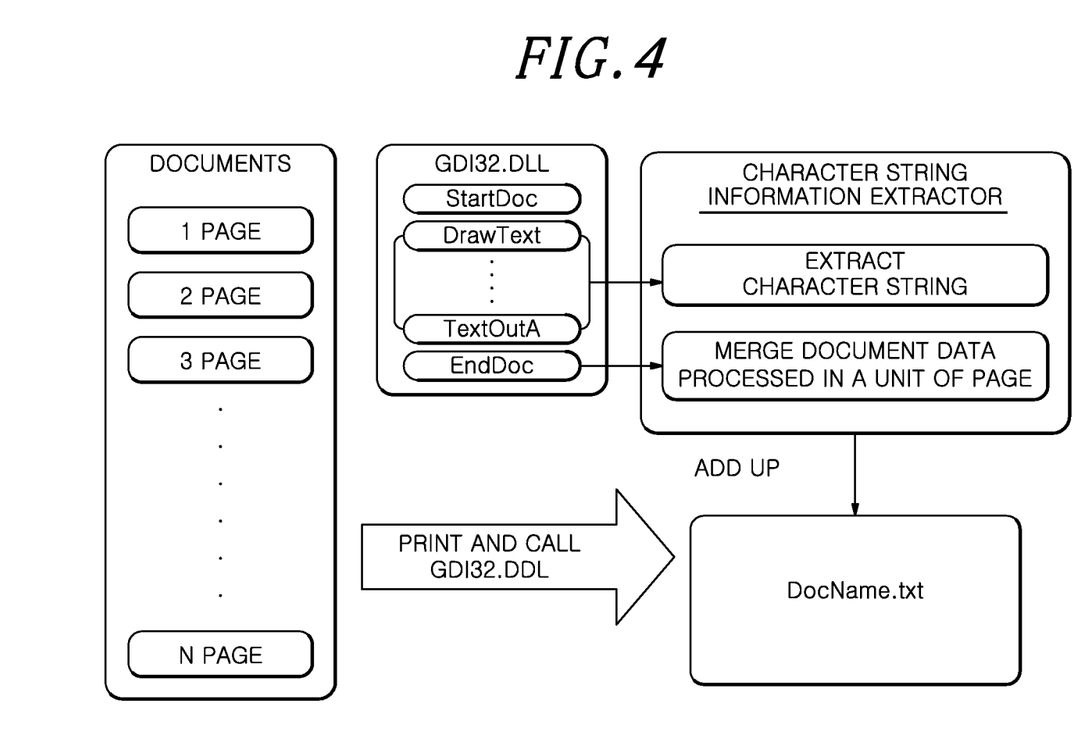
FIG. 4 is a detailed flowchart illustrating a procedure for extracting character string information in a method of securing confidential information of printed documents in a cloud computing environment in accordance with an embodiment of the present invention.

FIG. 4 is a detailed flowchart illustrating a procedure for extracting character string information in a method of securing confidential information of printed documents in a cloud computing environment in accordance with an embodiment of the present invention, wherein a character string is needed to detect confidential information, first, and it is needed to know printing start/end information and timing point to record the character string on DC (Device Context) in order to extract the character string.

Specifically, in order to extract character string information of the document data requested to print, the character string information extractor 210 calls a printout related GDI32.DLL file of a document processor included in a client terminal 200 using an API hooking and monitors a StartDoc( ) and EndDoc( ) functions indicating printing start/end in real time. Then, the character string information extractor 210 extracts character string information using at least one character string related function of character string related functions indicating timing points to extract the character string (for example, DrawTextA( ), DrawTextW( ), DrawTextExA( ), DrawTextExW( ), ExtTextOutA( ), ExtTextOutW( ), TextOutA( ), TextOutW( ), PolyTextOut( ), TabbedTextOut( ), etc.), stores the document data processed in a unit of page as a file (for example, DocName.txt), and then transfers the file to a confidential information detector 211. Simultaneously, the character string information extractor 210 switches to a normal mode.

Next, the confidential information detector 211 included in the client terminal 200 compares hash information for the document data requested to print with hash information previously stored in the hash information DB 230 in advance to make a determination thereof at Block S400.

Thereafter, in case that there is hash information identical to the hash information for the document data requested to print in the hash information DB 230 as a result of the comparison at Block S400, the confidential information detector 211 compares the document data processed at Block S300 with at least one preset confidential information pattern data, thereby detecting confidential information at Block S500.

Figure 5:
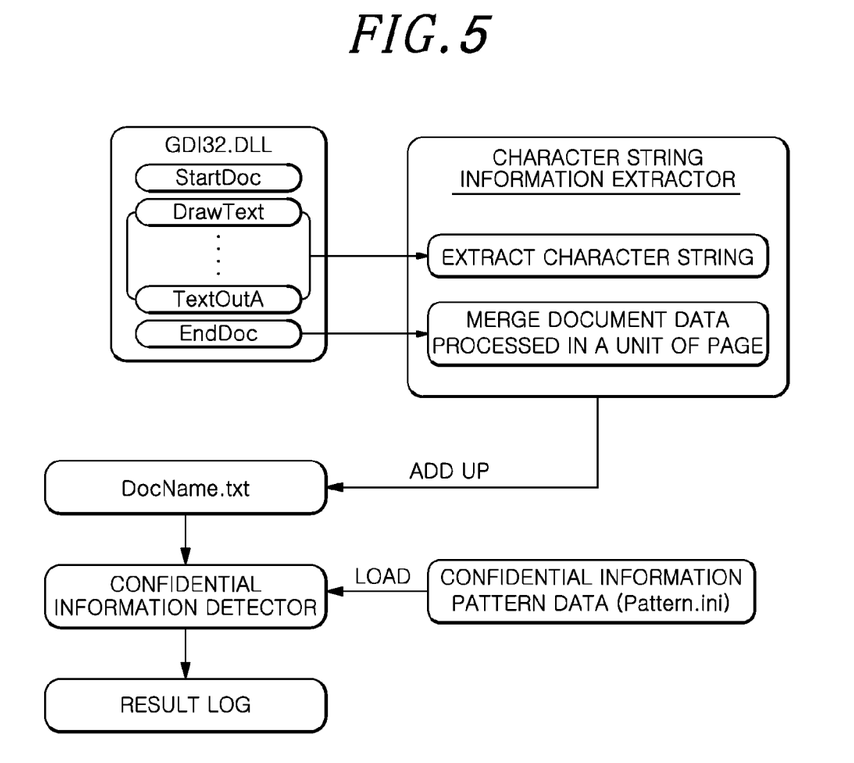
FIG. 5 is a detailed flowchart illustrating a procedure for detecting confidential information in a method of securing confidential information of printed documents in a cloud computing environment in accordance with an embodiment of the present invention.

FIG. 5 is a detailed flowchart illustrating a procedure for detecting confidential information in a method of securing confidential information of printed documents in a cloud computing environment in accordance with an embodiment of the present invention. In FIG. 5, in order to detect confidential information from document data requested to print, the confidential information detector 211 included in a client terminal 200, loads predetermined confidential information pattern data (for example, Pattern.ini file) and then receives a file including the document data processed in the character string information extractor 210 in a standby state.

The confidential information detector 211 compares a file including the document data processed with the predetermined confidential information pattern data, thereby detecting confidential information matched to the confidential information pattern. As such, when the confidential information matched to the confidential information pattern is detected, it may be possible to minimize error check ratio and excessive check ratio by checking the checksum. It is preferred to store the detection result in an 'int' file format.

Figure 6:
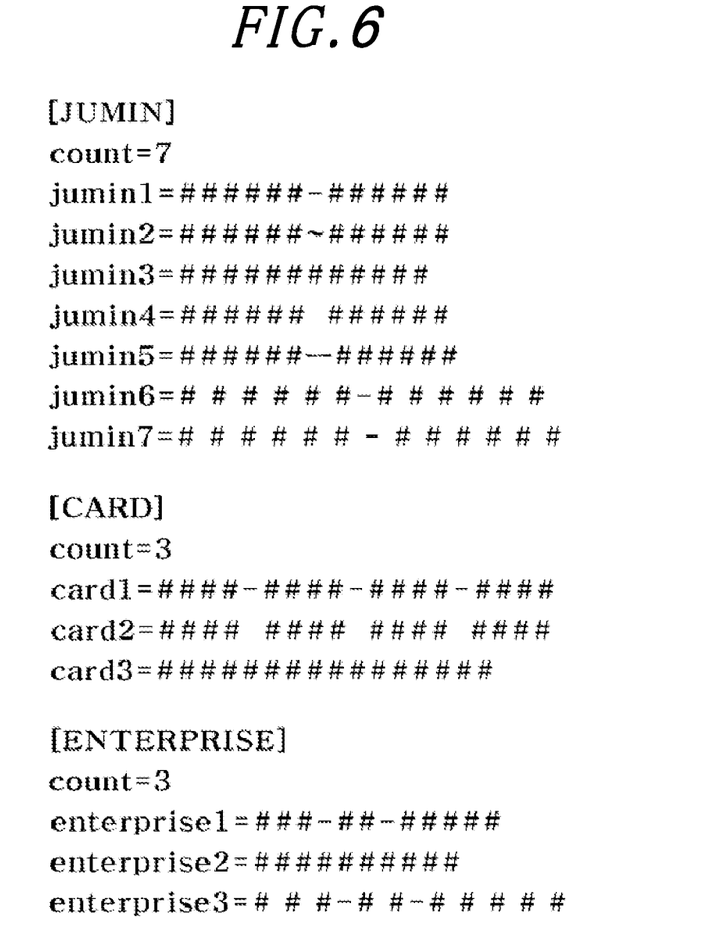
FIG. 6 is a view illustrating some types of confidential information pattern data applied in an embodiment of the present invention.

FIG. 6 is a view illustrating some types of confidential information pattern data applied in an embodiment of the present invention. The confidential information pattern data, that is, a confidential information detection pattern is defined as follows. For example, a [JUMIN] section has 7 patterns of identification number such as a social security number or resident registration number, and '#' indicates a location of personal information (for example, ###### ####### (820917-1111111).

In addition, a key value of 'jumin6' has spaces, which are used for extracting irregular character string. Since each document has a different identification number type, it is preferred to provide a variety of patterns. Likewise, other personal information may also be configured in patterns matched to their types.

After that, the controller 212 in the client terminal 200 controls a document processor of the client terminal 200 to analyze the kind and number of the confidential information detected at Block S500 and prohibits or secure the document data requested to print according to a security policy predetermined at Block S600.

Figure 7:
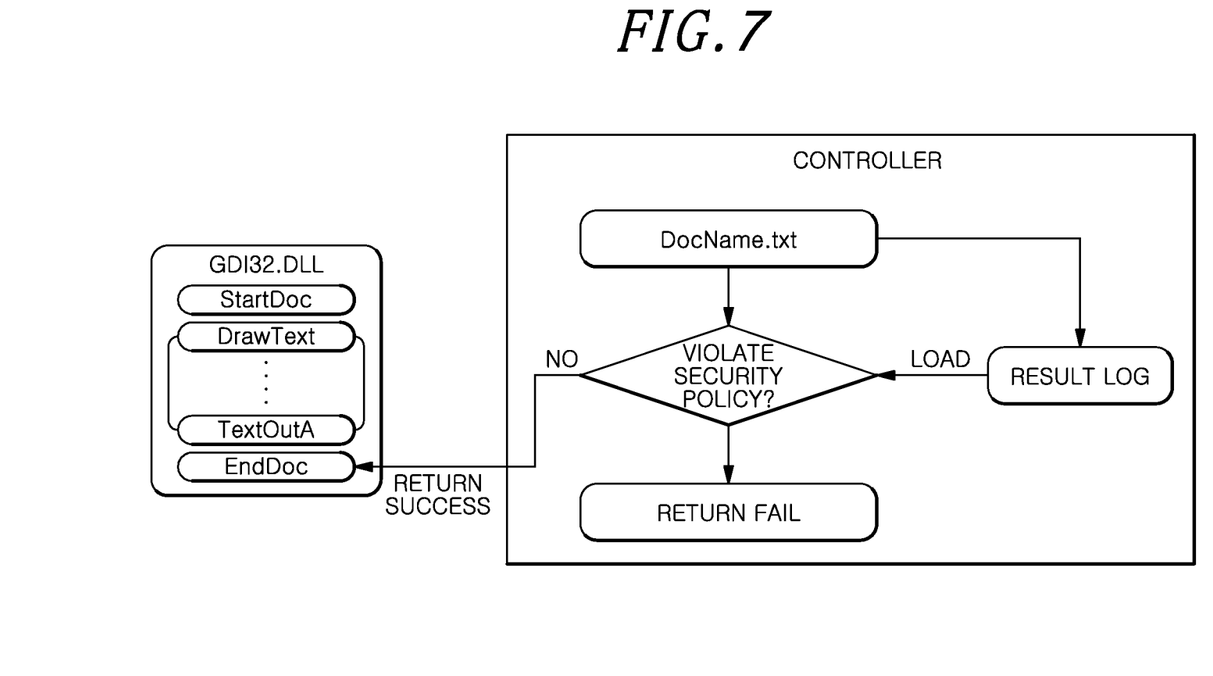
FIGS. 7 and 8 are detailed flow diagrams illustrating procedures for blocking and securing printing of document data including confidential information in a secure method of confidential information of printed documents in a cloud computing environment in accordance with an embodiment of the present invention.
Figure 8:
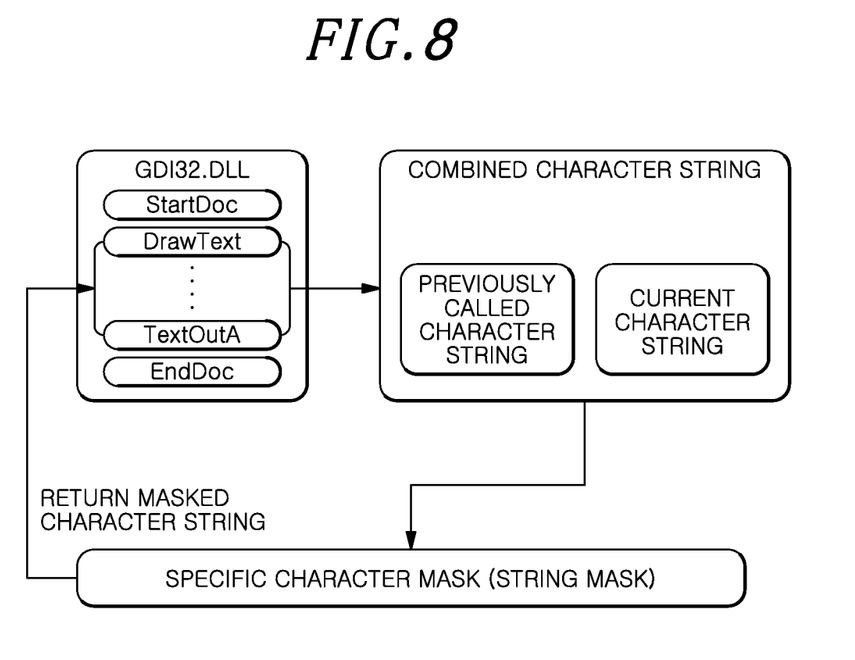

FIGS. 7 and 8 are detailed flow diagrams illustrating procedures for prohibiting and securing the printing of document data containing confidential information in a method of securing confidential information of printed documents in a cloud computing environment in accordance with an embodiment of the present invention. In these procedures, the controller 212 in the client terminal 200 loads a confidential information detection result file, analyzes kind and number of the confidential information, and prohibits the printing in case that the file violates a predetermined security policy.

Specifically, in case that the number of the confidential information detected at Block S500 is more than a reference value predetermined, it is prohibited to print the document data requested to print in accordance with the predetermined security policy.

For example, in case that a security policy is set to prohibit the printing only when ten (10) or more identification numbers are included, it is controlled to prohibit the printing when the number of the identification number of a detection result log file is equal to or more than ten, and it is controlled to permit the printing when the number of the identification number is less than ten.

In this regard, in order to accomplish the control, the security policy does not return a success (Return Success) but returns an output failure code (negative number) to the document processor (Return Fail) by calling EndDoc( ) function in the EndDoc( ) function normally.

Meanwhile, in order to secure confidential information after permitting the printing in accordance with the security policy, the confidential information character string is masked with specific characters (for example, #, * and so on) as illustrated in FIG. 8.

That is, in case where the number of confidential information detected at Block S500 is less than a predetermined reference value, the controller 212 controls a document processor of a client terminal 200 to mask some characters of the confidential information character string with a predetermined specific character and secure the confidential information.

The procedure to mask will be described in more detail as follows. When functions related to the first character string (for example, DrawTextA( ), DrawTextW( ), DrawText ExA( ), DrawTextExW( ), ExtTextOutA( ), ExtTextOutW( ), TextOutA( ), TextOutW( ), PolyTextOut( ), TabbedText Out( ), and so on), are called, it is confirmed whether there is confidential information for a document string. If the document string includes the confidential information, the document string is masked and then stored in the previous character string.

From the second or later call, it is determined whether there is confidential information by combining the previous character string value and the current character string value. It is because the confidential information may not identify when the confidential information is called separately in a printing call procedure. When the masking is completed, the character string is returned.

Meanwhile, it is preferred that the confidential information comprises at least one of identification number, telephone number, card number, corporation number, business registration number, account number, e-mail address, passport number, mobile phone number or driver's license number, for example.

Additionally, after Block S300, the character string information extractor 210 in the client terminal 200 may further perform additional procedures of storing the document data processed as a file and transferring the file to the confidential information detector 211.

Furthermore, after Block S500, the confidential information detector 211 in the client terminal 200 may further perform procedures of detecting confidential information from document data processed in the character string information extractor 210 and then performing a checksum, thereby minimizing data errors.

Meanwhile, the method for protecting confidential information on the printed document in a cloud computing environment in accordance with an embodiment of the present invention may also be implemented as a computer-readable code in a computer-readable recording medium. The computer-readable recording medium includes any type of recording devices in which data readable by a computer system is stored.

For example, the computer-readable recording medium includes a ROM, RAM, CD-ROM, magnetic tape, hard disk, floppy disk, mobile storage device, non-volatile memory (flash memory), optical data storage device and the like.

Also, the computer-readable recording medium may be stored and performed in the form of codes that are distributed to computer systems connected via a computer communication network and can be read in a distribution method may be stored and executed in the computer-readable recording medium.

While embodiments of the system and method for securing confidential information of printed documents in a cloud computing environment in accordance with the present invention have been described, the present invention is not limited thereto. Various modifications can be made to the above-described exemplary embodiments of the present invention without departing from the spirit or scope of the invention and are intended to be embraced by the scope of the present invention.

What is claimed is:

1. A client terminal for receiving a cloud computing service from a cloud server that provides the cloud computing service, the client terminal comprising:
   a character string information extractor configured to extract character string information from document data requested to print in a printer that is connected to the client terminal;
   a confidential information detector configured to detect confidential information from the extracted character string information; and
   a controller configured to prohibit printing of the document data including the character string of the detected confidential information or to mask at least one or more characters of the character string of the detected confidential information, with predetermined specific characters.

2. The client terminal of claim 1, wherein the character string information extractor is configured to extract character string information from the document data before the document data requested to print in the printer that is connected to the client terminal is transformed into a pictorial format.

3. The client terminal of claim 1, wherein the character string information extractor is configured to extract the character string information from the document data based on printing start/end information for the document data.

4. The client terminal of claim 3, wherein the printing start/end information is obtained using an AIP (Application Programming Interface) hooking.

5. The client terminal of claim 1, wherein the confidential information detector is configured to compare the character string information extracted with at least one preset confidential information pattern data, thereby detecting confidential information.

6. The client terminal of claim 1, wherein in case that the number of the detected confidential information is more than a predetermined reference value, the controller is configured to mask at least one or more characters of a character string of the detected confidential information with a predetermined specific character.

7. The client terminal of claim 1, wherein the controller is configured to prohibit printing of the document data in case that the number of the detected confidential information is more than a predetermined reference value.

8. The client terminal of claim 1, wherein the character string information extractor is configured to process the document data in a unit of page after extracting the character string information, and
   wherein the confidential information detector is configured to compare the processed document data with the at least one preset confidential information pattern data, thereby detecting the confidential information.

9. The client terminal of claim 8, wherein the character string information extractor is configured to generate first hash information for a file downloaded through the cloud computing service of the cloud server, and
   wherein the confidential information detector is configured to generate second hash information for the document data, and in case that there is hash information identical to the second hash information in the generated first hash information, compare the processed document data with the at least one preset confidential information pattern data, thereby detecting confidential information.

10. The client terminal of claim 1, wherein the confidential information detector is configured to detect confidential information from the processed document data by the character string information extractor and then perform a checksum, thereby minimizing data errors.

11. A method for securing confidential information of documents printed using a printer connected to a client terminal in a cloud computing environment in which the client terminal having a character string information extractor, a confidential information detector and a controller is connected to a cloud server over a wired/wireless communication network, the method comprising:
    extracting character string information from document data requested to print in the printer connected to the client terminal;
    detecting confidential information from the extracted character string information; and
    controlling to prohibit printing of the document data including the character string of the confidential information detected or to mask at least one or more characters of the character string of the detected confidential information with a predetermined specific character.

12. The method of claim 11, wherein said extracting character string information comprises extracting character string information from the document data before the document data requested to print in the printer connected to the client terminal is transformed into a pictorial format.

13. The method of claim 11, wherein said extracting character string information comprises extracting the character string information from the document data based on printing start/end information for the document data.

14. The method of claim 13, wherein the printing start/end information is obtained using an AIP (Application Programming Interface) hooking.

15. The method of claim 11, wherein said detecting confidential information comprises comparing the extracted character string information with at least one preset confidential information pattern data, thereby detecting confidential information.

16. The method of claim 11, wherein in case that the number of the confidential information detected is more than a predetermined reference value, said controlling comprises masking at least one or more characters of the character string of the detected confidential information with a predetermined specific character.

17. The method of claim 11, wherein said controlling comprises blocking printing of the document data in case that the number of the detected confidential information is more than a predetermined reference value.

18. The method of claim 11, wherein said extracting character string information comprises processing the document data in a unit of page after extracting the character string information, and
　　wherein said detecting confidential information comprises comparing the processed document data with the at least one preset confidential information pattern data, thereby detecting the confidential information.

19. The method of claim 18, wherein said extracting character string information comprises generating first hash information for a file downloaded through the cloud computing services of the cloud server, and
　　wherein said detecting confidential information comprises generating second hash information for the document data, and in case that there is hash information identical to the second hash information in the first hash information generated, comparing the document data processed with the at least one preset confidential information pattern data, thereby detecting confidential information.

20. The method of claim 11, wherein said detecting confidential information comprises detecting confidential information from the document data produced by processing the character string information extractor and then performing a checksum, thereby minimizing data errors.

\* \* \* \* \*